March 24, 1959
W. F. HOLIN
2,878,760
RAILWAY VEHICLE TRUCK
Filed Aug. 4, 1954
2 Sheets-Sheet 2
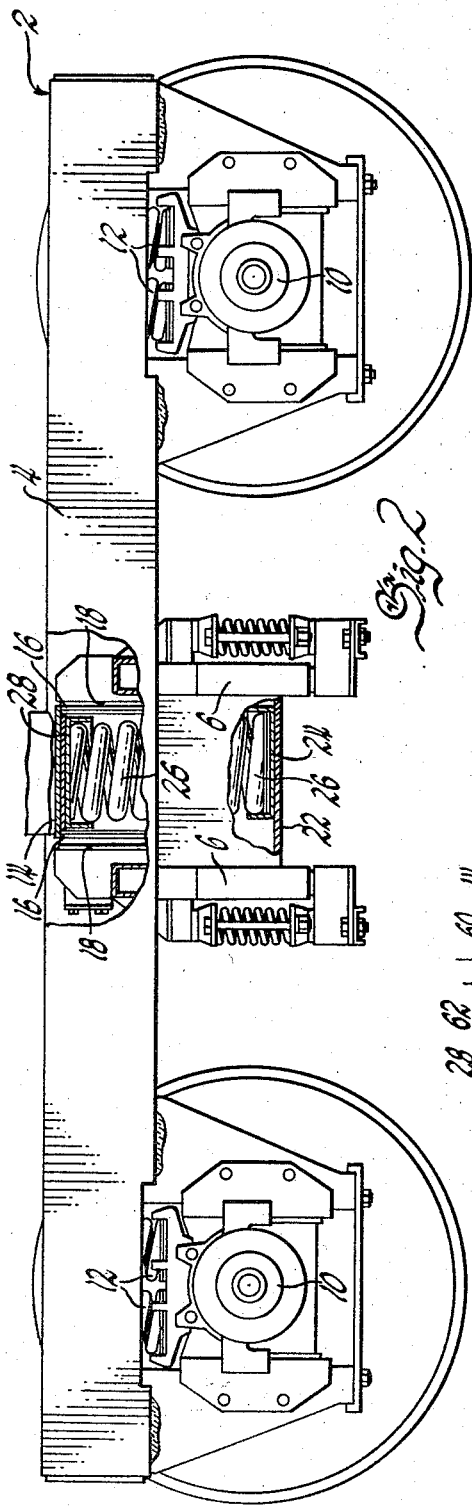
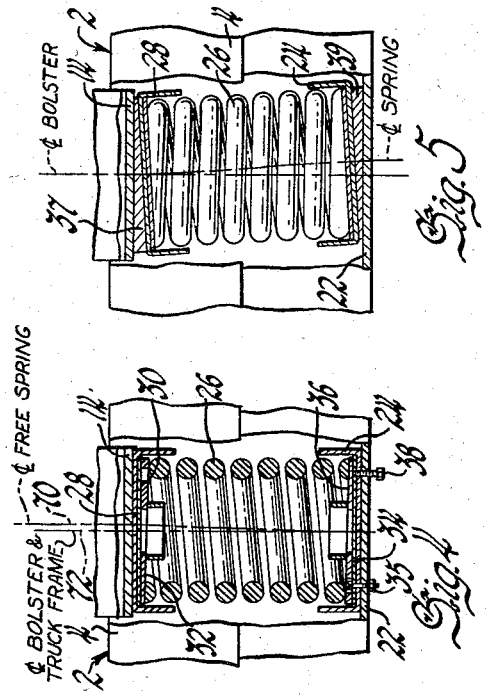
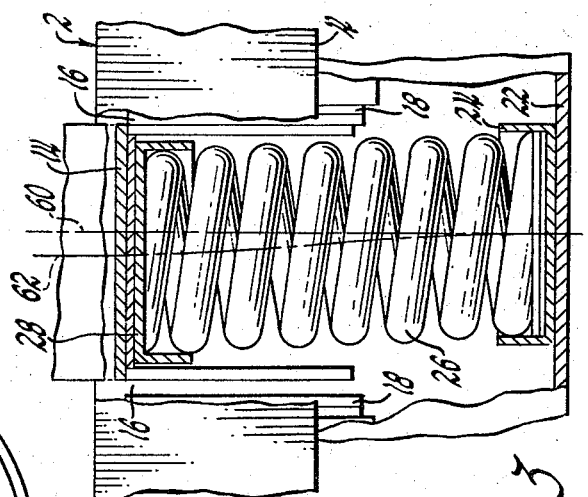
Inventor
William F. Holin
By S. E. Thorpe
Attorney

United States Patent Office 2,878,760
Patented Mar. 24, 1959

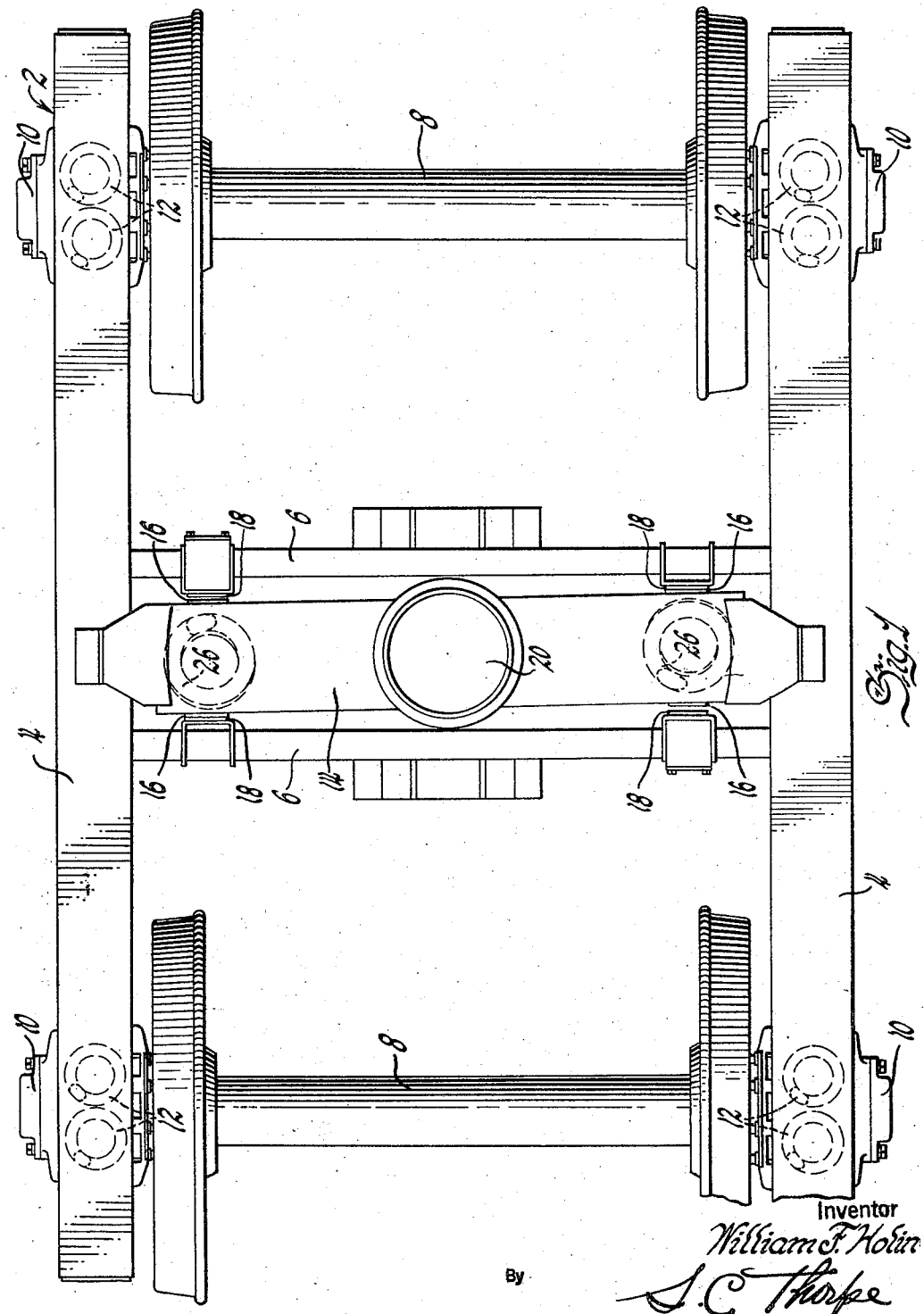

2,878,760

RAILWAY VEHICLE TRUCK

William F. Holin, Riverdale, Ill., assignor to General Motors Corporation, Detroit, Mich., a corporation of Delaware Application August 4, 1954, Serial No. 447,774

2 Claims. (Cl. 105—193)

This invention relates to railway vehicle trucks of the type which includes a truck frame having a truck bolster resiliently supported thereon for movement relative thereto and more particularly to unique snubbing means for damping oscillatory movement of the truck bolster relative to the truck frame created by dynamic forces acting thereon.

One of the objects of this invention is to provide in a truck of the above type cooperating damping surfaces between the bolster and the frame which are brought into engagement by uniquely placing the spring seats on bolster and frame so that the bolster supporting springs apply a substantially horizontal turning moment to the bolster.

A more specific object of this invention is to damp oscillatory movement of the bolster relative to the truck frame by oppositely longitudinally inclining the transverse bolster springs supporting the bolster on the frame so that a substantially horizontal turning moment is exerted on the bolster which creates frictional forces between cooperating damping surfaces on bolster and frame.

It is a further object of this invention to provide means for longitudinally oppositely inclining the bolster spring seats on the truck frame after the opposite ends of the bolster springs have been anchored in the corresponding spring seats on bolster and frame.

For a clearer understanding of these and other objects of this invention reference may be had to the accompanying detailed description and drawings, in which:

Fig. 1 is a plan view of a railway vehicle truck including a truck frame having a bolster resiliently supported thereon illustrating how a turning moment has been applied to the bolster relative to the truck frame whereby damping of bolster movement relative to the frame takes place because of engagement between oppositely disposed cooperating surfaces on bolster and frame.

Fig. 2 is a side view in elevation of the truck with parts broken away to illustrate how the spring seats on the frame have been longitudinally offset relative to those on the bolster so that the springs are longitudinally inclined and a turning moment is applied to the bolster.

Fig. 3 is an enlarged fragmentary view illustrating in more detail how the bolster and frame spring seats have been longitudinally offset relative to each other.

Fig. 4 shows a modification in which wedge-shaped spring shims are used inside the spring seats to incline the bolster springs longitudinally in opposite directions so as to apply a turning moment to the bolster.

Fig. 5 is a further modification showing wedges acting between the lower bolster spring seats and the frame and the upper bolster spring seats and the bolster to oppositely longitudinally incline the bolster springs and apply a turning movement to the bolster.

Referring now to Figs. 1 and 2 the truck having a frame indicated generally by a numeral 2 comprises a pair of longitudinally extending side frame members 4 secured in parallel relationship by a pair of transversely extending transom members 6. The side frame members 4 are resiliently supported at their opposite ends by wheel and axle sets 8 the axles of which have their ends journalled in the usual journal box assemblies 10 on which rest helical coil springs 12 acting against the undersides of the side frame members 4. Resiliently supported on the truck frame 2 in a manner to be described with more particularity later is a bolster 14. The bolster 14 is provided with oppositely disposed longitudinally end facing chafing plates 16 on the ends thereof. Cooperating longitudinally center facing chafing plates 18 are suitably secured to the transom members 6 and are adapted to engage corresponding bolster chafing plates 16. The bolster 14 is provided with the usual center bearing support 20 adapted to support the end of a railway vehicle (not shown).

Referring now to Figs. 2 and 3 it will be observed that extending between the transom members 6 are transversely spaced plates 22 to which are secured the transversely spaced spring seats 24 for the lower ends of the bolster springs 26. Downwardly facing spring seats 28 have been transversely spaced on and secured to the underside of the bolster 14. It will be observed, however, that as viewed in Fig. 3 the lower spring seat 24 has not been longitudinally centered between the chafing plates 18 on the near side of the truck as viewed in the figure but rather has been located closer to the right-hand chafiing plate 18. A corresponding but opposite shift has been made in the case of spring seat 24 on the far side of the truck so that the spring seat 24 on the far side of the truck has been located longitudinally closer to the chafing plate 18 on the far left-hand side of the truck as viewed in Figs. 1, 2 and 3. By relocating the spring seats 24 in the foregoing manner and inserting therein the ends of bolter supporting springs 26 it should be readily appreciated that a substantially horizontal counterclockwise moment is applied to the bolster 14 when viewed in Fig. 1. This moment causes diagonally opposite corresponding chafing plates 16 and 18 on the bolster and the transom members to frictionally engage other whereby damping of both vertical and lateral movement of the bolster relative to the frame is achieved. It is recognized that the same result may also be achieved by leaving the lower spring seats 24 centered between the chafing plates 18 and instead relocating the upper spring seats 28 on the bolster 14 so that they are longitudinally and oppositely offset with respect to the chafing plates 16.

A modification which also enables the bolster supporting spring to also be used as damping means for damping movement of the bolster relative to the frame is shown in Fig. 4. In Fig. 4 it will be observed that located in the spring seat 28 on the bolster 14 is a wedge-shaped spring shim 30 which has a horizontally and longitudinally inclined surface 32 on which the upper end of the bolster spring 26 is seated. A similar wedge-shaped shim 34 is located in the upwardly facing bolster spring seat 24 on the truck frame 2 and is provided with a horizontally and longitudinally inclined surface 36 which is substantially parallel to the surface 32 and on which is seated the lower end of the bolster spring 26. By inclining the ends of these springs on the surfaces 32 and 36 the near end of the bolster will tend to move to the right as viewed in the Fig. 4. If a corresponding set of shims 30 and 34 is used with the far bolster spring 26 so that the surfaces are inclined longitudinally but opposite to surfaces 32 and 36, the far end of bolster 14 will tend to move to the left and a counterclockwise moment will be applied to the bolster relative to the truck frame when viewed from the top thereof as in Fig. 1. This counterclockwise moment, as already stated, causes diagonally opposite cooperating chafing plates 16 and 18 on the bolster and the frame to engage each other and damp movement of the bolster relative to the truck frame. The modification of Fig. 4 includes a further feature comprising means for positioning the bolster springs in the lower seats 24 on the frame 2 so that the axes of the springs are initially vertical and the bolster 14 can be easily and quickly assembled on the upper ends of the bolster springs 26. This is accomplished by means of one or more bolts 38 suitably threaded in each of the plates 22 which engage the underside of each shim or wedge 34 and when turned raise one end thereof so that surfaces 36 are horizontal. Once the bolster springs are in place and the bolster including the spring seats 28 has been placed over the upper ends of the bolster springs 26 the bolts 38 may be turned to lower the shims or wedges 34 so that the inclined surfaces 36 become operative to generate the forces exerting a turning moment on bolter 14. The bolts 35 are for the purpose of preventing the turning of shims 34 in seats 24.

A third modification is shown in Fig. 5 wherein instead of locating wedges having inclined surfaces in the bolster spring seats there are wedges 37 and 39 located between the seats and the frame and the seats and the bolster and the upper and lower spring seats 28 and 24 have also been offset longitudinally. This arrangement when reversed and repeated for the opposite end of the bolster also causes a moment to be applied to the bolster which creates frictional damping forces between the cooperating longitudinally end and center facing chafing plates on bolster and frame.

It should be recognized that what has actually been done in each case is to deflect horizontally the upper ends of the bolster springs relative to their lower ends so that these upper spring ends tend to return to the position they would normally be in if these upper ends were free. For example, the upper ends of the spring 26 shown in Figs. 2 and 3 if free would be located directly above the lower end thereof and the spring axis would coincide with the vertical line indicated by 60. By longitudinally offsetting upper and lower spring seats 28 and 24 on bolster and frame and anchoring the upper and lower ends of the aforementioned spring 26 therein spring 26 has in effect been deflected by a horizontal force causing the axis of spring 26 to assume an S-shape coinciding with the line 62 and creating a counter-force tending to restore the spring 26 to the position where its axis would again coincide with line 60. This counter-force causes one of the chafing plates 16 on an end of bolster 14 to exert pressure against its associated chafing plate 18 on the truck frame 2 creating the forces which damp vertical and lateral movement of bolster 14 relative to truck frame 2.

In the modification of Fig. 4 instead of longitudinally offsetting upper spring seats 28 and 24 these seats have been left in vertical alignment with each other and the seating surfaces have been longitudinally inclined. With this arrangement of the lower seat 24, if the upper end of spring 26 were free, the axis of the spring would coincide with the straight but longitudinally inclined line 70 (neglecting the weight of the spring). However, as viewed in Fig. 4 the upper end has been moved to the left and longitudinally of the truck so that the upper spring end is located vertically over the lower end and sits on a spring seat surface parallel to the lower end spring seat surface. This causes the spring axis now to assume an S-shape which coincides with line 72 and generates a force tending to restore spring 26 to its free position. This restoring force, as previously explained, creates the damping frictional forces between bolster and frame.

The modification of Fig. 5 is actually a combination of the first two modifications and has the spring seat surfaces longitudinally inclined as well as the upper and lower seats longitudinally offset. This arrangement provides greater flexibility with respect to selecting the proper damping forces to be created.

From the foregoing description it may be appreciated that applicant has utilized his bolster supporting springs in a unique way to not only support the bolster for vertical and lateral swinging movement on the truck frame but to create forces which will frictionally damp this swinging movement. Applicant has eliminated the need for separate, costly damping devices which not only take up precious space on the railway trucks but add to the weight as well.

It is recognized that applicant's structure illustrated and described herein is capable of a large number of modifications, such as providing only one longitudinally inclined spring, or one longitudinally inclined spring seat surface on either bolster or frame, etc. These modifications are believed to be encompassed by the scope of applicant's invention and in consequence whereof it is applicant's intention to lay claim to all such modifications.

I claim:

1. In a railway vehicle truck, a truck frame, a truck bolster, cooperating damping surfaces on said bolster and frame, a pair of transversely disposed spring seats on said bolster having downwardly facing spring seating surfaces longitudinally oppositely inclined with respect to each other, a pair of transversely disposed spring seats on said frame each disposed below and longitudinally spaced from one of said seating surfaces and longitudinally inclined in the same general direction as the surface associated therewith, helical coil bolster supporting springs having their upper ends anchored in the spring seats on said bolster and seated on said surfaces and their lower ends anchored in the seats on said frame, whereby frictional forces are created between said cooperating surfaces which damp movement of said bolster relative to said frame.

2. In a railway vehicle truck, a truck frame, a truck bolster, cooperating damping surfaces on said bolster and frame, a pair of transversely disposed spring seats on said bolster having downwardly facing spring seating surfaces longitudinally oppositely inclined with respect to each other, a pair of transversely disposed spring seats on said frame each associated with one of said seating surfaces and spaced longitudinally with respect thereto and diagonally opposite with respect to each other, helical coil bolster supporting springs having their upper ends anchored in the spring seats on said bolster and their lower ends anchored in the spring seats on said frame, whereby a turning moment is applied to said bolster creating frictional forces between said cooperating surfaces to damp movement of said bolster relative to said frame.

References Cited in the file of this patent

UNITED STATES PATENTS

| | | |
|---|---|---|
| 1,657,934 | Martin | Jan. 31, 1938 |
| 2,125,275 | Goodwin | Aug. 2, 1938 |
| 2,157,005 | Nylander | May 2, 1939 |
| 2,492,337 | Travilla | Dec. 27, 1949 |
| 2,700,346 | Rossell | Jan. 25, 1955 |